United States Patent [19]
Bealing et al.

[11] Patent Number: 5,666,691
[45] Date of Patent: Sep. 16, 1997

[54] METHOD OF ATTACHING INSULATION TO MOLDED AUTOMOTIVE FLOORS

[75] Inventors: Andrew A. Bealing, Hanover; Vinod Parekh, Mechanicsburg; Kurt Grigg, Enola, all of Pa.

[73] Assignee: Lear Corporation, Southfield, Mich.

[21] Appl. No.: 530,827

[22] Filed: Sep. 20, 1995

[51] Int. Cl.⁶ .................................................. A47G 27/04
[52] U.S. Cl. ................................................................ 16/4
[58] Field of Search ............................ 16/4, 5, 6, 7, 8, 16/9, 10

[56] References Cited

U.S. PATENT DOCUMENTS

| | | |
|---|---|---|
| 1,675,998 | 7/1928 | Walters ............................. 16/4 |
| 2,657,948 | 11/1953 | Sturtevant ........................ 16/4 |
| 4,406,033 | 9/1983 | Chisholm et al. ................ 16/4 |
| 4,561,146 | 12/1985 | Schaty ............................. 16/4 |
| 4,829,627 | 5/1989 | Altus et al. ...................... 16/4 |
| 4,998,319 | 3/1991 | Ford ................................ 16/4 |
| 5,014,390 | 5/1991 | De Gastines .................... 16/4 |
| 5,192,599 | 3/1993 | Sakamoto ........................ 16/4 |

Primary Examiner—Chuck Y. Mah
Attorney, Agent, or Firm—Thomas A. Beck

[57] ABSTRACT

A method for securing an underpad to automotive and trunk floor coverings comprising contacting the bottom side of a floor coveting having a fiber face top layer and a thermoplastic backing layer bottom layer with an underpad, then attaching the floor covering to an underpad using a thermoplastic mechanical fastening means.

13 Claims, 3 Drawing Sheets

5,666,691

METHOD OF ATTACHING INSULATION TO MOLDED AUTOMOTIVE FLOORS

BACKGROUND OF THE INVENTION

1. Field of the Invention

The invention relates to a process of attaching insulation pads to automotive floor coverings using a thermoplastic fastener.

2. Description of the Prior Art

The present invention relates to floor carpets such as those used in the passenger compartments or luggage compartments of automobiles, and in particular, it relates to means for attaching underpads to the backings of the floor carpets.

Floor coverings that are found in automobiles generally are made with a carpeted face surface and backed with a pliable thermoplastic material such as polyethylene, polypropylene, and ethylene vinyl acetate. The automotive trucks and vans also use floor coverings made of thermoplastic materials such as vinyls or thermoplastic olefins. Attached to that pliable thermoplastic backing generally is a fiber or foam insulation material which makes the vehicle quieter and more comfortable, and cuts down on noise and heat transfer into the interior of the automobile. These insulation pads can either be flat, or molded in a three-dimensional shape as desired.

Presently there are at least two ways presently used to attach the insulating pads to the floor coverings.

A first method is to place the insulation pad into the bottom half of the carpet molding tool and actually mold the carpet onto the pad. The pad will bond to the carpet backing provided the thermoplastic carpet backing was heated to a high enough temperature to reach its softening point and become sticky. A problem with this procedure is that problems occur in cooling the thermoplastic carpet backing when it is in the mold. There is no easy way to remove the heat from the carpet backing because the pad acts as an insulator between the chilled molding surface and the hot thermoplastic carpet backing. The carpet backing must be cooled before removing from the mold to maintain its molded shape, and the result is a much longer cycle time in the mold than is desired.

A second method of attaching the underpad to the carpet backing is to bond it with an adhesive after the carpet has been molded. This method of attachment requires very short cooling cycles because the thermoplastic carpet backing will be in direct contact with the cool molding tool. Draw-backs to this method are the cost of the adhesive, additional labor costs of gluing and the environmental issues. Special adhesives that will pass the automotive performance specifications are required which limits the choices. Finally, adhesive also has to be compatible with the carpet backing and the type of the pad being used, requiring various types of adhesives or various backing and pad constructions. Solvent based adhesives create the environmental problems, requiring pollution control and health hazards for the operators. Cleaning of equipment used for handling of the adhesives, disposal of excessive adhesive etc. produce additional environmental problems.

The automotive industry is striving towards "green cars," which are designed for disassembly, such that after the vehicles of the future have reached the end of their life cycle, the vehicles can be stripped and disassembled and its components can be recycled back in to other automotive parts. Bonding the insulation pads to the floor covering either in the mold or by adhesives, makes it very difficult to separate the two components for recycling.

SUMMARY OF THE INVENTION

The present invention relates to a process of attaching insulation pads to automotive floor coverings. The aforementioned floor coverings are either: a carpet comprising an uppermost fiber face layer and a backing layer of thermoplastic material; or a thermoplastic sheet. An insulation pad is attached to the back side of either of the floor coverings noted using a thermoplastic mechanical fastener. The mechanical fastener projects down from the floor covering through the insulation pad and attaches the pad to the floor covering.

Forming of the floor covering to a shape to fit the contour of the automotive sheet metal body and the attaching the mechanical fasteners to the backside of the floor covering are accomplished simultaneously.

The floor covering of the present invention has an advantage of attaching the insulation pad after molding to produce very short molding cycle times and also eliminate the need for using adhesives for bonding. Any desired number of plastic fasteners are attached to the backside of the floor covering (See FIG. 1) during the molding operation. The fastener has a large head and a hollow stem, projecting vertically downwards from the floor covering when the floor covering is in its horizontal plane when installed in the vehicle. In a subsequent step, the floor covering will be placed on a fixture and the insulation pad will be located over it. Precut holes in the insulation will match the pin locations. By assembling a second part of the mechanical fastener to each of the pins, the insulation pad will be secured and attached to the floor covering.

The pins are attached in the molding operation by placing the stem of the pin into a hole located in the lower surface of the mold. When the heated thermoplastic carpet backing is placed into the molding tool, and the mold closes, the flat head of the pin comes in contact with backside of the floor covering and it bonds to it after cooling in the mold. This method eliminates the appearance of push pin head showing on the upper surface of the floor covering assembly, and adds a secure method of attaching.

DESCRIPTION OF THE PREFERRED EMBODIMENTS

Figure 1:
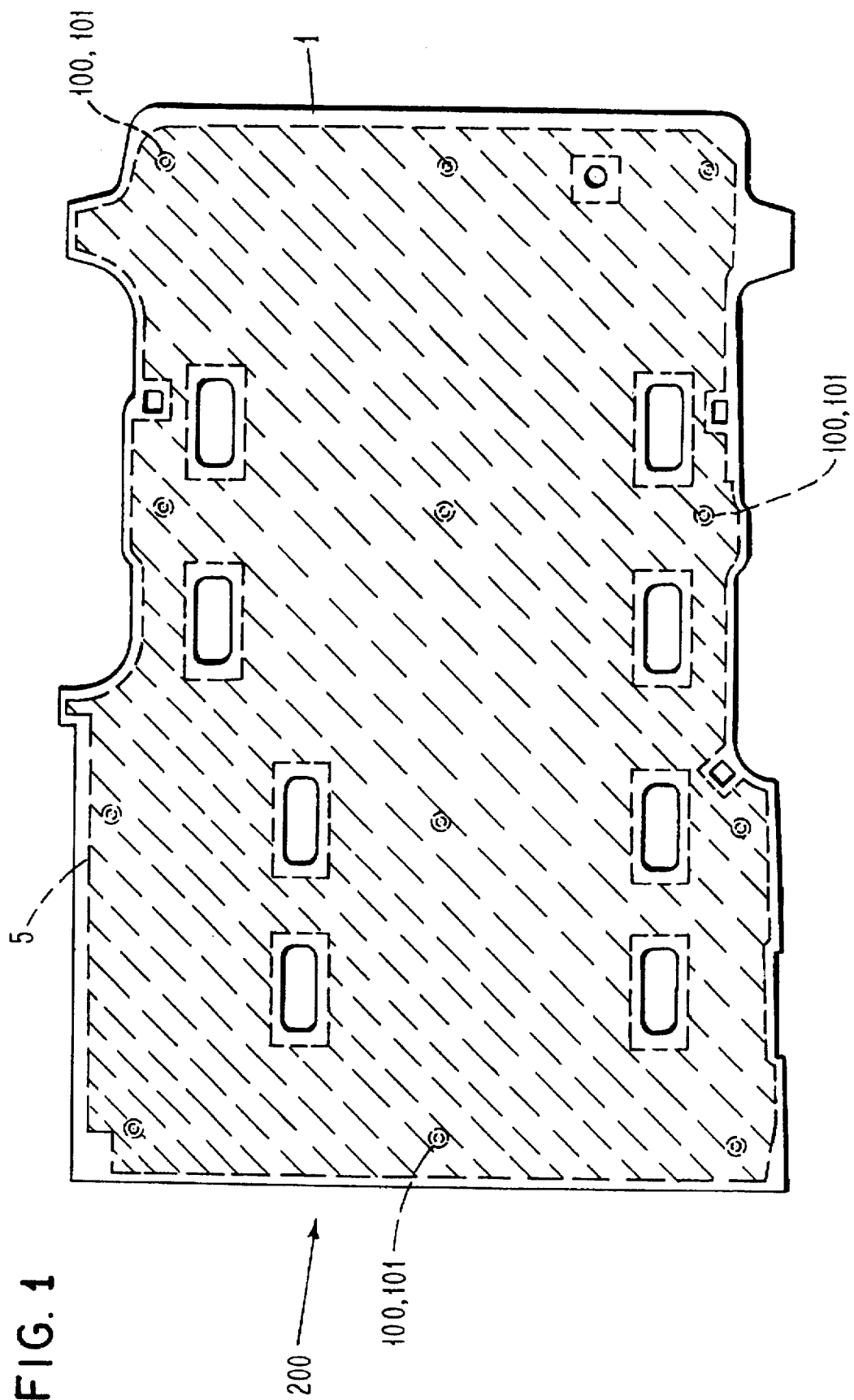
FIG. 1 is a plan view of the overall assembly showing the full size part with the underpad attached to a carpet backing using 12 fasteners.

The present invention will now be described in more detail with reference to the accompanying drawings, in which preferred embodiments of the invention are shown.

The carpet layer can be formed from any convenient woven or non-woven process using any suitable fiber-forming material.

Nonwoven fabrics are characterized by an intimate, three dimensional fiber entanglement produced by the mechanical action of barbed needles rather than by application of heat, moisture and pressure.

Suitable yarns used in the nonwoven fabrics of the present invention are formed from any fiber-forming synthetic polymer, typically nylon 6, nylon 6,6, polyethylene, polypropylene, polyester such as polyethylene terephthalate (PET) or any of the acrylics.

The fibers are first blended by the same carding techniques used for other manufacturing processes. The blended fibers are then arranged into a web or batt by mechanical or air-lay systems. This arrangement maybe completely random, i.e. the fibers lay in no established pattern, giving the fabrics equal strength in all directions; or the fibers maybe arranged so that they are parallel; to one other in each separate layer used to form the fabric. In addition it is possible to make a needle felt with the fibers all arranged in the same direction. The system in which the fiber layers are alternated provides good strength, but fabric made in which all fibers are arranged in one direction has strength in that direction only.

There are several types of needle punching machines used to make the nonwoven fabrics used in the present invention, but the operation of all is similar. The needles, which have barbs protruding from the shaft, move through the fibers, and the barbs push the fibers into distorted and tangled arrangements. The web is contained by metal plates above and below, so the fibers cannot be pulled or pushed beyond the web layer. As the web moves slowly through the machine, the needles punch as many times as desired for the end product.

A backing, generally having a melt index of at least about 12, is applied and fused to the underside of the nonwoven carpet.

Tufted carpets are composite structures in which the yarn that forms the pile (the surface of the carpet) typically nylon 6, nylon 6,6, polyethylene, polypropylene, polyester such as polyethylene terephthalate (PET), acrylics, wool, cotton and the like, is needled through a base or backing fabric such as a spun polyester. The yarn used in forming the pile of a tufted carpet can be made of any fiber known to be useful for tufted carpets.

The base of each tuft extends through the backing fabric referred to above, and is visible on the bottom surface of the composite structure. Tufted carpets may be classified as loop and cut pile carpets.

In loop carpets, yarn loops are formed by needling or punching a continuous yarn through the base fabric, thus forming the base of the carpet, while the tops of the loops are generally ¼ to ¾ inch long, thus forming the wearing surface of the carpet.

Cut pile carpets although not generally used in luggage compartments, may be used if convenient. These have the same base as the loop carpet, however the tops of the loops have been split or the tips of the loops have been cut off. The surface of the cut pile carpet is thus formed by the open ends of the numerous "U"-shaped pieces of yarn. The base of the "U"-shaped yarn is embedded in the base fabric.

The loops of yarn are needled through and embedded in the primary backing (which combination forms the raw tufted carpet), thus forming the tufted base.

The base fabric or primary backing may be of any known type in the art, such as nonwoven polymer fabric. The aforementioned primary backings are formed from materials such as woven or nonwoven, (e.g. spun-bonded) polypropylene and nonwoven polyester webs and fabrics and blends thereof.

The tufts are inserted by needling into a base fabric and are only loosely attached. An application of a back coating is, therefore, required to secure the tufts firmly in place as well as to consolidate and stiffen the carpet foundation. Other objectives in the application of back-coating compositions include dimensional stability and providing a firm but flexible heat and sound insulation.

The backing material is a low melting thermoplastic material, often filled with inorganic particulate fillers such as calcium carbonate, barium sulfate or talc.

The underpad is formed from cotton or such plastic materials as phenolic resins, rebonded foam, etc.

Figure 2:
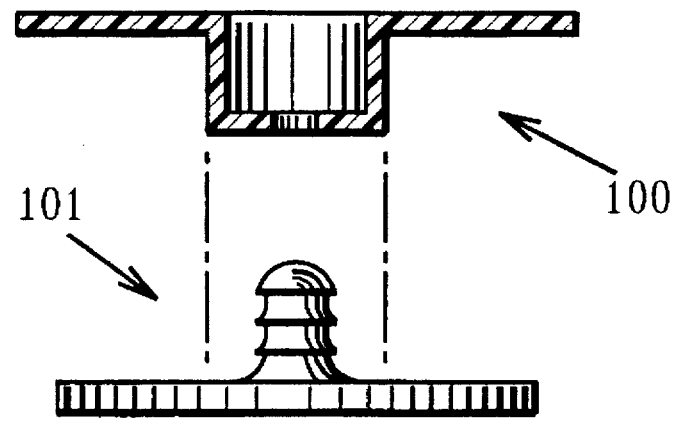
FIG. 2 is a cross sectional view of the fastener used in the present invention in its unattached state.
Figure 3:
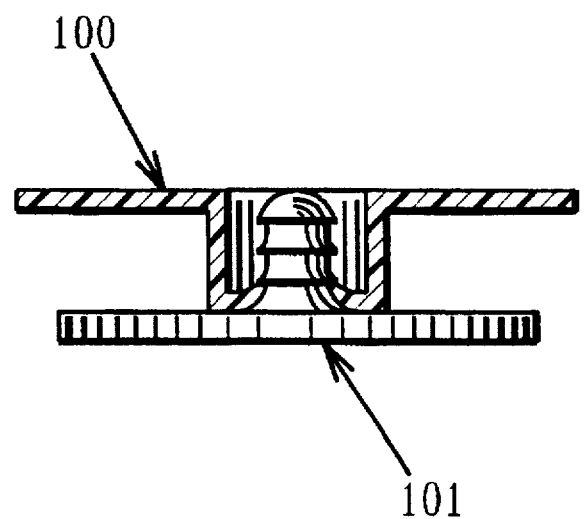
FIG. 3 is a cross sectional view of the fastener used in the present invention in its attached state.

Mechanical fasteners are used to secure the underpad to the carpet backing. FIG. 2 depicts a cross sectional view of preferred fastening means 100 and 101, unattached. FIG. 3 depicts a cross sectional view of the mechanical fastener of the present invention wherein elements 100 and 101 noted above are engaged and secured. Elements 100 and 101 depicted in FIG. 3 form a locked entity as the configuration of the elements prevent these elements from being dislodged.

Figure 4:
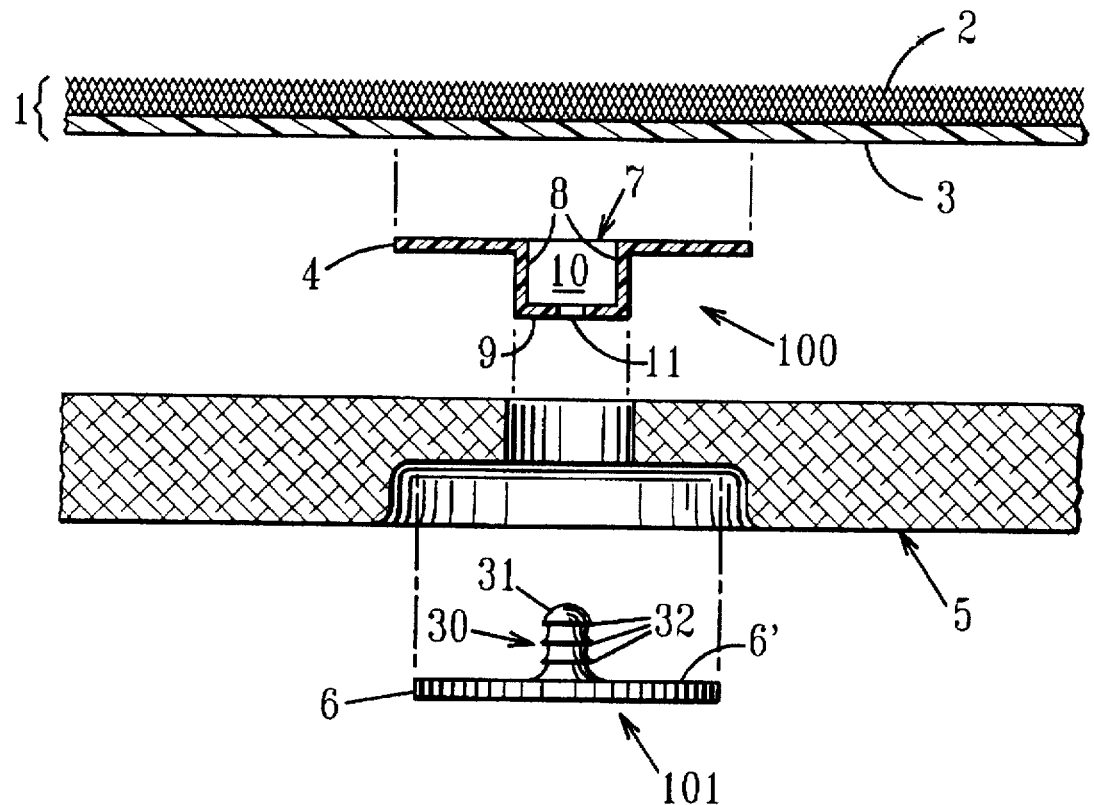
FIG. 4 is a cross sectional view of the fastener used in the present invention in an unattached and unassembled form.

Referring to FIG. 4, the floor covering of the present invention is indicated by the reference character 1 as an automotive carpet construction. As illustrated in FIG. 4, the carpet construction bas six main components: the uppermost face layer 2, a carpet backing base layer 3 of thermoplastic material, an injection molded female mechanical fastener 100 made of plastic material, a underpad 5 made of cotton or synthetic fibers, and an injection molded male mechanical fastener 101 used to hold the underpad in place.

Any suitable fastening means can be used to secure the carpet backing 3 to the insulation pad 5. Mechanical fasteners such as screw type, force fit push pin or "J" hook type assemblies which fit into a suitable aperture in a socket to secure the fastener can be used as long as insulation pad 5 can be separated from carpet backing 3 when it is desired to recycle the carpet assembly. The fastening means must be made from a thermoplastic material which is recyclable and is also capable of being molded and thus fused to the underside of carpet backing 3.

The preferred embodiment of the mechanical fastener means used to secure the carpet backing 5 to insulation pad 3 secured to carpet layer 2 shown in an exploded view shown in FIG. 4 comprises a first element 101 which is a push pin assemblage having a flat head 6 and a shaft 30 perpendicular to said head 6 and having rounded tip 31 on the end of shaft 30, said tip being secured diametrically opposite the center portion of flat head 6. Shaft 30 between tip 31 and the underside 6' of flat head 6 contains a series of parallel annular rings 32, 32' which are so configured that they form saw tooth edges.

The second element 100 of the preferred mechanical fastening means is a socket 7 having a base 4 which is melt fused to the underside of carpet backing layer 3. The socket contains walls 8 that connect base 4 with a circular disc 9 covering cavity 10 said cavity 10 being defined by base layer 3, walls 8 and disc 9. Disc 9 contains an aperture 11 centrally located thereon that provides access to cavity 10 defined by elements 3, 8 and 9 listed above.

Disc 9 having aperture 11 is made of a flexible thermoplastic material so that it will flex sufficiently to allow shaft 30 to enter same. The edge of aperture 11 and the saw-tooth edges of shaft 30 provide a ratchet and pawl effect in that each of the acute edges 32, 32' of shaft 30 will advance past the edge of opening 11 into the cavity space 10, but shaft 30 cannot easily be withdrawn therefrom. Aperture 11 has a diameter slightly less than the widest portion of the diameters of shaft 30 which includes the segment of saw-tooth elements 32 that are positioned perpendicular to and extend from shaft 30. One of the aforementioned segments contacts the underside of disc 9 and as a result of the locking engagement, it is difficult to withdraw the pin from the socket 7 without the use of substantial force.

As depicted in FIG. 4, the openings through the underpad are countersunk so that elements 100 and 101 comprising the fastening means are contained within the underpad and are positioned flush with or below the respective surfaces of the underpad.

Figure 5:
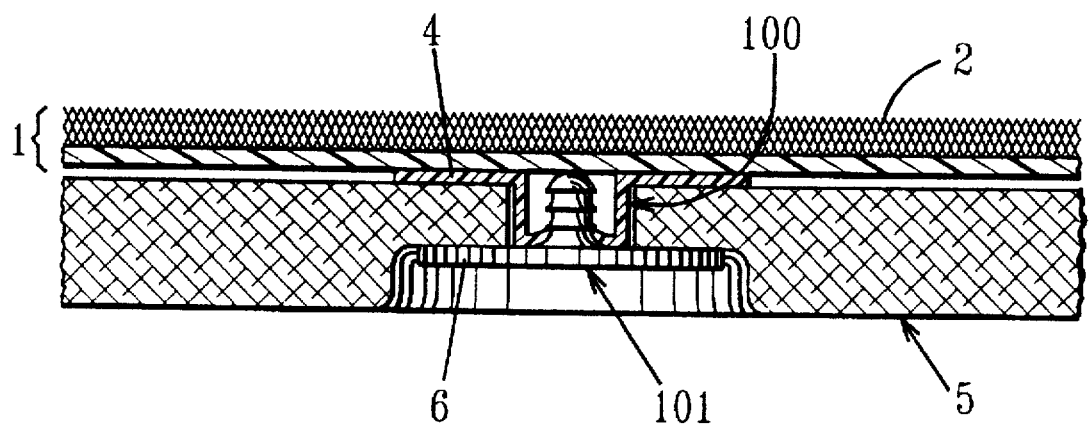
FIG. 5 is a cross sectional view of the fastener used in the present invention that has an underpad attached to the underside of a carpet assembly.

FIG. 5 depicts the carpet assembly fully installed with the fastening means in place securing the underpad to the carpet.

The upper most face layer 2 is preferably a carpet layer. A particularly desired construction is one in which the carpet layer has a pleasing "hand" or feel, and also has an aesthetically pleasing pattern of design appeal. The uppermost face layer can be a pile carpet having a primary backing and pile yarns extending from the primary backing to form tufted loops which can be cut in the tufting operation to deliver a cut pile carpet. The tufted pile yarns are maintained permanently in place by the base layer 3, comprising an extruded thermoplastic material. Suitable thermoplastic materials used in the backing include polyethylene, ethylene vinyl acetate, and polypropylene. The thermoplastic materials are characterized by the capability of being extruded at a temperature of from about 200° F. to 450° F. in a soft condition which then assume a rigid condition when cool.

Element 100 is generally an injection molded piece of plastic made from a nylon, polyethylene or any such material.

Generally, with respect to the various possible embodiments of the pushpins noted above, the size of the head of the pushpin is generally about 1¼" in diameter and about 0.050" or less thick. The shaft that protrudes from the center of the head is approximately ½" in diameter and will vary in length depending on the underpad thickness. The inside of the socket 7 is designed in such a way that fastener element 101 mechanically fastens inside the socket 100 as noted above. Once fastener element 101 is placed into fastening element 100, the two become locked and it is difficult to disassemble same without great force. The fastener element 101 is also made from similar type thermoplastic material and also is injection molded.

The process of attachment begins at the outset of the molding operation. Mechanical fastener element 100 is placed in the mold by pushing the stem into a similar size opening in the mold. The holes in the molding tool are drilled at the exact location as that of the holes in the underpad and the size of the holes should be such that the stem will stay fixed but can be removed if necessary.

The thermoplastic carpet backing 3 is then heated to a temperature so that it begins to soften and it becomes moldable. The carpet backing is loaded into the mold, and the upper molding tool closes pushing the carpet backing against the lower molding tool. As the hot carpet backing comes into contact with base 4 of element 100; it softens the plastic material comprising base 4 and it thus bonds (fuses) to the carpet backing. The upper and lower half of the molding tool is then chilled which causes the carpet backing to cool quickly. The head of the mold is then raised and the molded composite assembly comprising the carpet and backing with the mechanical fasteners bonded thereto are removed as one assembly.

The carpet assembly are placed on an attachment table so that thermoplastic backing material 3 with elements 100 are facing up and carpet face 2 is facing down. Insulation pad 5 is then positioned on top of the carpet backing such that sockets 7 of mechanical fastener element 100 are aligned with and pass through the holes provided in pad 5 and are visible on the opposite side. An operator or machine then will place mechanical fastener element 101 into as many of the fastening elements 100 that are present which are necessary to secure the underpad to the carpet backing. The mechanical fastener heads must be recessed below the underpad surface to prevent rattling on the sheet metal of the vehicle.

It must be realized that the illustrative details and general requirements of this invention may be altered or modified without departing from the spirit or scope of the invention, as defined in the appended claims.

While one complete embodiment of the invention has been disclosed herein, it will be appreciated that modification of this particular embodiment of the invention may be resorted to without departing from the scope of the invention as defined in the appended claims.

Having thus described our invention what we claim and desire to protect by Letters Patent is:

1. A method for securing an underpad to automotive and trunk coverings to form a composite comprising:

molding first thermoplastic fastening means to the underside of a thermoplastic backing layer that secures a fiber face layer, said layers forming a carpet composite;

contacting said thermoplastic backing layer with an underpad having substantially the same dimensions as said composite; having an upper surface and a lower surface; and having openings therethrough from said top surface to said lower surface;

positioning said composite and said underpad so that a portion of said opening at said upper surface of said underpad has a diameter sufficient to receive and contain said first thermoplastic fastening means;

inserting a second thermoplastic fastening means comprising a head and a shaft into said first thermoplastic fastening means through the lower surface of said opening, a portion of said opening at the lower surface having a diameter sufficient to receive and contain said head of said second thermoplastic fastening means, and a narrower diameter sufficient to allow said shaft to pass through and be received in locked engagement with said first thermoplastic fastening means, thereby securing said composite to said underpad.

2. The method of forming the composite defined in claim 1 wherein said shaft of said thermoplastic fastening means is grooved to interact with said opening in said first fastening means to provide a ratchet-pawl effect to prevent said shaft from slipping out of said opening.

3. The method of forming the composite defined in claim 2 wherein said thermoplastic backing layer is filled with inorganic particulate fillers.

4. The method of forming the composite defined in claim 3 wherein said inorganic filler is selected from the group consisting of calcium carbonate, barium sulfate and talc.

5. The method of forming the composite defined in claims 4 wherein said fiber face layer of said carpet comprises non-woven yarns.

6. The method of forming the composite defined in claim 5 wherein said nonwoven carpet is formed from a fiber-forming polymer selected from the group consisting of nylon 6, nylon 6,6, polyethylene, polypropylene, polyester or polyacrylic.

7. The method of forming the composite defined in claim 6 wherein said fiber-forming polymer is a polyester.

8. The method of forming the composite defined in claim 7 wherein said polyester is polyethylene terephthalate.

9. The method of forming the composite defined in claims 4 wherein said fiber face layer of said carpet comprises woven yarns.

10. The method of forming the composite defined in claims 9 wherein said carpet is formed from a fiber-forming polymer selected from the group consisting of nylon 6, nylon 6,6, polyethylene, polypropylene, polyester, polyacrylic, wool or cotton.

11. The method of forming the composite defined in claim 10 wherein said fiber-forming polymer is a polyester.

12. The method of forming the composite defined in claim 10 wherein said polyester is polyethylene terephthalate.

13. The method of forming the composite defined in claim 1 wherein said fastener is selected from the group consisting of screws and threaded fittings, force fit push pin, and "J" hook assembly.

* * * * *